United States Patent
Bodin

(10) Patent No.: US 8,847,723 B2
(45) Date of Patent: Sep. 30, 2014

(54) CONTACTLESS CONNECTOR FOR USE IN A GAS TURBINE

(75) Inventor: Robert Michael George Bodin, Hampshire (GB)

(73) Assignee: Weston Aerospace Limited, Farnborough, Hampshire (GB)

( * ) Notice: Subject to any disclaimer, the term of this patent is extended or adjusted under 35 U.S.C. 154(b) by 864 days.

(21) Appl. No.: 12/458,523

(22) Filed: Jul. 15, 2009

(65) Prior Publication Data
US 2010/0123540 A1 May 20, 2010

(30) Foreign Application Priority Data
Jul. 18, 2008 (GB) .................................. 0813243.3

(51) Int. Cl.
*H01F 17/04* (2006.01)
*H01F 17/06* (2006.01)
*H01F 27/24* (2006.01)
*H01F 27/28* (2006.01)

(52) U.S. Cl.
USPC ............ 336/221; 336/178; 336/212; 336/220

(58) Field of Classification Search
USPC .................... 336/178, 212, 184, 220–222
See application file for complete search history.

(56) References Cited

U.S. PATENT DOCUMENTS

| 386,927 | A | * | 7/1888 | Gee et al. ......................... 182/53 |
| 4,739,260 | A | | 4/1988 | Proctor |
| 5,291,829 | A | | 3/1994 | Avory et al. |
| 6,445,270 | B1 | * | 9/2002 | Ogasawara ................... 336/182 |
| 7,148,679 | B2 | * | 12/2006 | Proctor ..................... 324/207.14 |
| 2003/0030530 | A1 | * | 2/2003 | Reinhard et al. ............... 336/182 |
| 2003/0222641 | A1 | | 12/2003 | Proctor |
| 2004/0004528 | A1 | * | 1/2004 | Gilmore et al. ............... 336/229 |
| 2005/0083040 | A1 | * | 4/2005 | Proctor ..................... 324/207.15 |
| 2007/0144732 | A1 | * | 6/2007 | Kim et al. ...................... 166/145 |

FOREIGN PATENT DOCUMENTS

GB         1 235 844       6/1971

OTHER PUBLICATIONS

UK Search Report dated Sep. 18, 2008 for GB 0813243.3.

* cited by examiner

*Primary Examiner* — Alexander Talpalatski
*Assistant Examiner* — Mangtin Lian
(74) *Attorney, Agent, or Firm* — Nixon & Vanderhye P.C.

(57) ABSTRACT

The invention provides a system for monitoring an operational parameter of a gas turbine, including a magnetic coupling between a signal source and a data output terminal. The magnetic coupling comprises a primary coil electrically connected to the signal source and wound around a first magnetic core section, and a secondary coil electrically connected to the output terminal but electrically isolated from the primary coil and wound around a second magnetic core section, wherein the first and second magnetic core sections are physically separated from one another.

9 Claims, 5 Drawing Sheets

TRANSDUCER

TRANSDUCER

CONTACTLESS CONNECTOR FOR USE IN A GAS TURBINE

This application claims priority to GB Application No. 0813243.3 filed 18 Jul. 2008, the entire contents of which are incorporated herein by reference.

The present invention relates to an electrical connector in a gas turbine. In particular, the invention relates to a system for relaying electrical signals from a signal source, such as a sensor, positioned within a gas turbine to processing equipment located outside the turbine.

Gas turbines (not only) are typically fitted with a number of transducers, which monitor various parameters of the gas turbine in operation. For example, the internal temperature, pressure of the turbine and the turbine shaft speed are monitored. Signals from the transducers have to be carried from within the gas turbine to the engine control system located outside the gas turbine. The interior of a gas turbine is a harsh, dirty and high temperature environment. Gas turbines are also highly complex and access to components buried in is the heart of the turbine can be difficult. This leads to long repair and maintenance times.

Currently, there are various methods of transferring a signal from within a gas turbine to equipment outside the gas turbine, and these vary in complexity, cost, reliability, and ease of assembly within the gas turbine itself.

Cost, reliability and ease of assembly are all crucial considerations. Every hour that an aircraft is out of service for repair or maintenance costs the aircraft operator thousands of dollars in lost revenue. For this reason, gas turbines desirably have a modular construction, so that parts can be easily and independently removed and repaired or replaced One typical example of a gas turbine transducer is a transducer that measures the speed and torque of the gas turbine shaft. FIG. 1 is a schematic diagram showing such a transducer 10 mounted adjacent to a toothed wheel 12 mounted on the shaft 14 of a gas turbine. Compressors and turbines 16 are mounted on the shaft 14. The transducer 10 measures the speed of the shaft. Signals from the transducer are relayed to the engine controls via a signal cable 18. Using this basic arrangement, there are currently three typical solutions for relaying the electrical signal from the transducer to the engine control system. Two of these solutions rely on a disconnect at position A in FIG. 1. The third option has no disconnect but has a signal cable formed as an integral part of the transducer. All three solutions rely on actual electrical contact, through mechanical means, to complete an electrical circuit.

FIG. 2 illustrates a first solution in accordance with the prior art for connecting the transducer to the signal cable shown in FIG. 1. The electrical connection is made via male 20 and female 21 gold plated pins within mating connectors 22. The two halves of the connector are screwed together by mating threads 23. This type of configuration has an upper operating temperature of 260° C., due to a) the silicone O-ring 25 sealing the connectors and b) the silicone or glass seals 24 holding the male and female electrical pins in place. In use, the male and female pins 20, 21 also vibrate together, causing fretting of the gold plating on the pins over time. This fretting can cause intermittent signal transmission.

FIG. 3 shows another type of connection that has been used: a stud and ring terminal connection. The transducer housing 30 has threaded studs 31 on its head for electrical connection and these are mounted in, or moulded into, a glass or insulation type material 32. Ring terminals 33, attached to the signal cable or harness, are attached with locking nuts 34 and washers 35 to the threaded studs 31. The harness then carries the signal out through the gas turbine casing, as shown in FIG. 1. This solution also has drawbacks. The threaded terminals 31 are exposed to the environment and are not intrinsically safe, as any high voltage induced e.g. during a lightning strike, or from an external source entering the system, could generate sparks between the terminals and ignite any flammable gas. Also, a short from the terminals to earth is possible. Contamination can build up on the terminals and cause low insulation resistance between the threaded studs. This contamination can cause intermittent signal transmission or total loss of signal transmission. The threaded studs 31 can also be broken off or damaged in such a way that the locking nuts 34 cannot be removed or screwed on. Furthermore, all the parts on the transducer housing head 30 are exposed to contaminates, such as salt, mist, water, oils, hydraulic fluids etc. and these can cause corrosion of the terminals.

FIG. 4 is a schematic illustration of a third solution known in the prior art, which is an integral transducer harness assembly. The transducer housing 40 has an integral harness 41 permanently connected to it, which covers the signal out through the gas turbine casing, as shown in FIG. 1. The transducer housing includes a harness support 42 that supports and seals the harness and transducer housing. Although this solution eliminates connection at the transducer head and the associated problems described with reference to FIGS. 2 and 3, it does not offer the modularity and installation flexibility that customers require, e.g. the possibility of removing the transducer without removing the harness. Transducers typically need to be replaced more often than harness assemblies, and so the ability to quickly is replace the transducer without puling out all the associated wiring is a significant benefit.

Accordingly, each of the existing solutions to transmitting electrical signals from within a gas turbine has drawbacks.

The present invention is defined in the attached independent claims, to which reference should now be made. Preferred features of the invention are defined in the dependent claims.

The invention provides a number of advantages over the previous, described solutions. For example, the system may operate at temperatures above 260° C. (to an upper limit of around 500° C., depending on the Curie temperature of the material forming the core sections). Contamination, such as oils, hydraulic fluids, etc. does not affect the magnetic coupling. The coupling will work in very wet conditions, including total submersion. The two magnetic couplings are unaffected by relative movement, during vibration. And the transducer is easy to assemble and install in a gas turbine engine.

A detailed description of embodiments of the invention will now be provided with reference to the accompanying drawings in which.

The present invention is based on the use of a transformer being able to transfer an AC signal over a small gap using a magnetic field rather than relying on an electrical contact.

The use of a split transformer as an electrical connector is known for other applications. For example, US 5291 1829 and GB 1235844 describe a transformer connection for a device used for ignition of explosive charges. However, until now it has not been contemplated in gas turbine engines.

Figure 1:
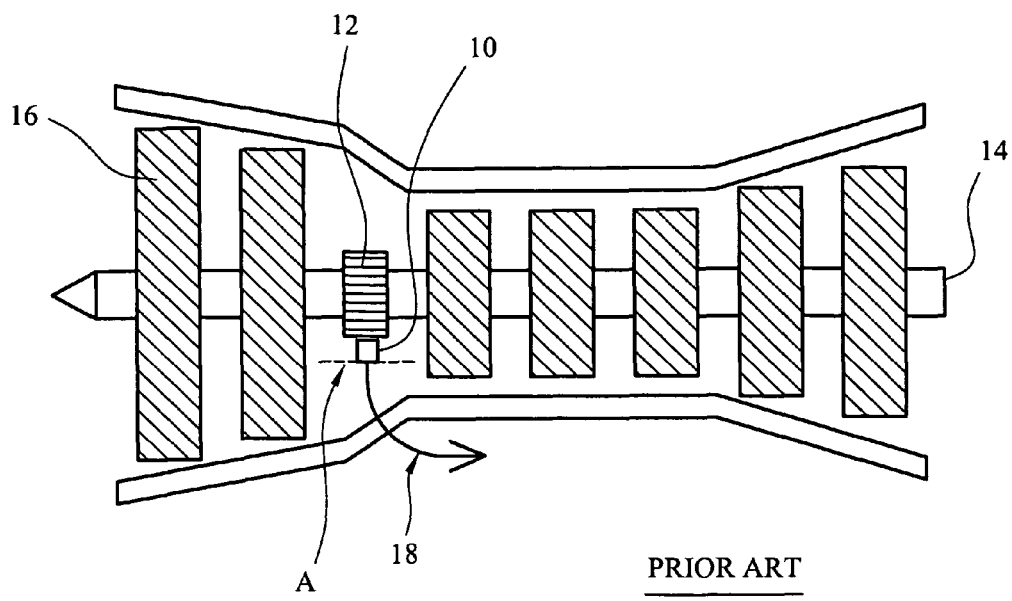
FIG. 1 is a schematic diagram showing the arrangement of a transducer and signal cable within a gas turbine.
Figure 2:
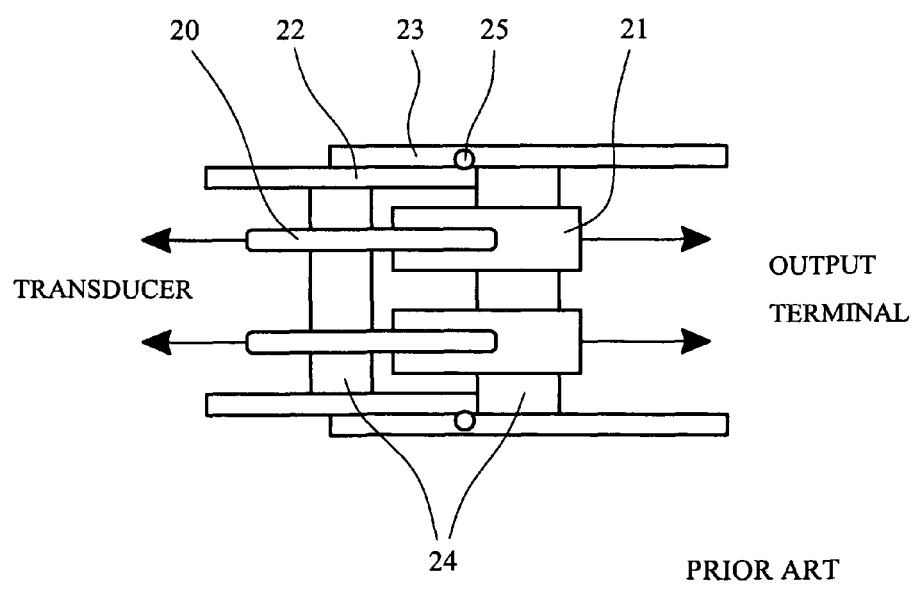
FIG. 2 is a schematic diagram of a first type of electrical connector in accordance with the prior art.
Figure 3:
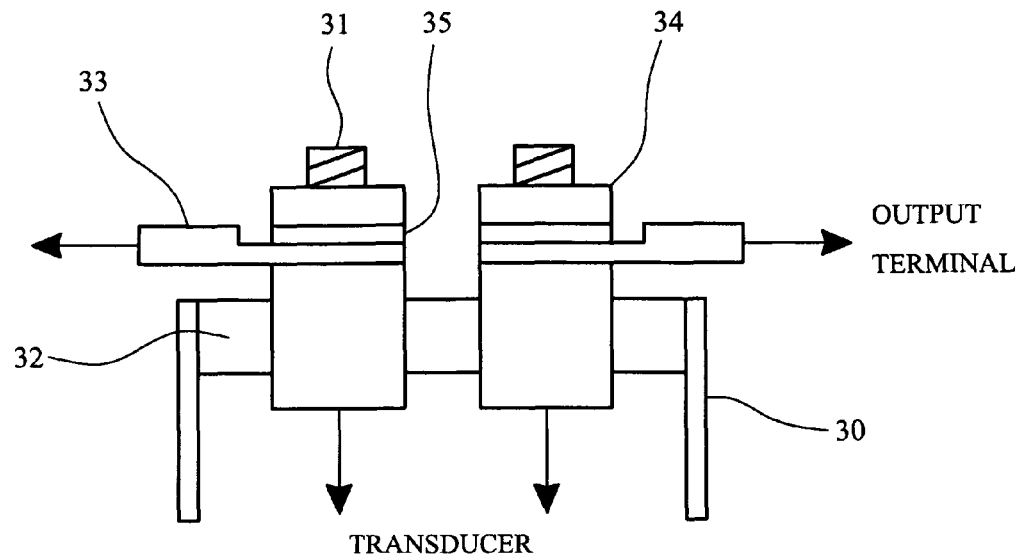
FIG. 3 is a schematic diagram of a second type of electrical connector in accordance with the prior art.
Figure 4:
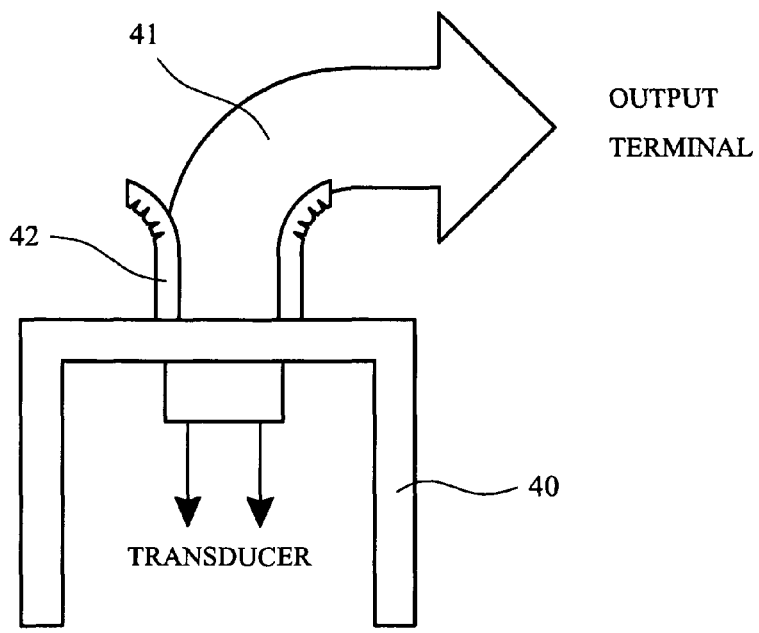
FIG. 4 is a schematic diagram of an integral transducer signal cable assembly in accordance with the prior art.
Figure 5:
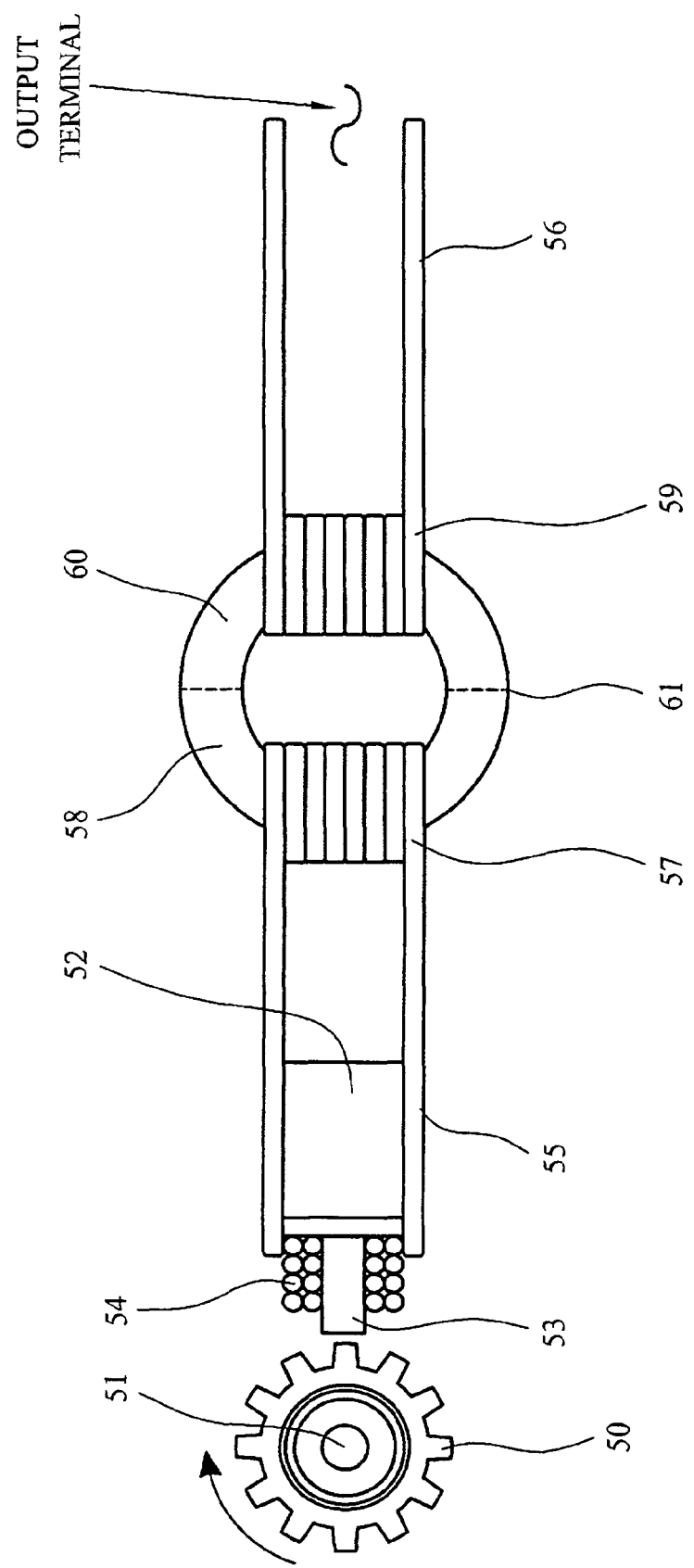
FIG. 5 is a schematic diagram showing a gas turbine monitoring system including a connector in accordance with the present invention.

FIG. 5 is a schematic illustration of a gas turbine monitoring system including a connector in accordance with the present invention. FIG. 5 shows a system that detects the speed of a turbine shaft. A toothed wheel 50, known as a phonic wheel, is mounted on the turbine shaft 51. The phonic wheel 50 is formed from a magnetic material, typically a ferromagnetic material. The transducer comprises a permanent magnet 52 connected to a magnetic pole piece 53, around which an electrically conductive coil 54 is wound. As the phonic wheel rotates, a voltage is induced in the coil 54 by changes in the magnetic flux associated with the pole piece, caused by the movement of a projection on the phonic wheel in the proximity of the pole piece. The resulting voltage signal can be analysed to determine the is rotational speed of the shaft. A system of this type is described in U.S. Pat. No. 7,148,679.

The AC voltage signal induced in the coil must be transferred from the transducer to data processing equipment, typically part of the engine control system. The connection between the transducer and the data processing equipment comprises a first circuit 55 connecting the transducer to a magnetic coupling, and a second circuit 56 connecting the magnetic coupling to an output terminal for connection to the data processing equipment. The magnetic coupling comprises a primary coil 57, which is a part of the first circuit, wound around a first magnetic core section 58 and a secondary coil 59, which is part of the second circuit, wound around a second magnetic core section 60. The first and second magnetic core sections are physically separate from each other so that a gap 61 can exist between them, across which a varying magnetic field transmits the signal from the transducer. In effect, the magnetic core sections form a separable joint. The magnetic core sections are shown in FIG. 5 as two halves of a circular ring, but they need not be in that particular shape.

The coupling transfers electrical energy from one circuit to another through inductively coupled electrical conductors forming the primary and secondary coils. A changing current in the primary coil creates a changing magnetic field. This magnetic field induces a changing voltage in the secondary coil. The primary coil may have the same number of turns or a different number of turns as the secondary coil in order to provide an output signal within a desired voltage range.

Utilizing a magnetic coupling for the transfer of a signal over a separable joint has various advantages over the prior art:

1 Electrical connectors are eliminated, along with the temperature restriction of 260° C.
2 Studs and ring terminals are eliminated.
3 The magnetic coupling is intrinsically safe.
4 Contamination, such as oils, hydraulic fluids, etc. will not affect the is magnetic coupling.
5 The coupling will work in very wet conditions including total submersion.
6 The first circuit can be isolated from the second circuit.
7 The two magnetic couplings are substantially unaffected by movement relative to each other in operation, such as occurs during vibration.
8 The transducer is easy to assemble and install in a gas turbine engine.

Figure 6:
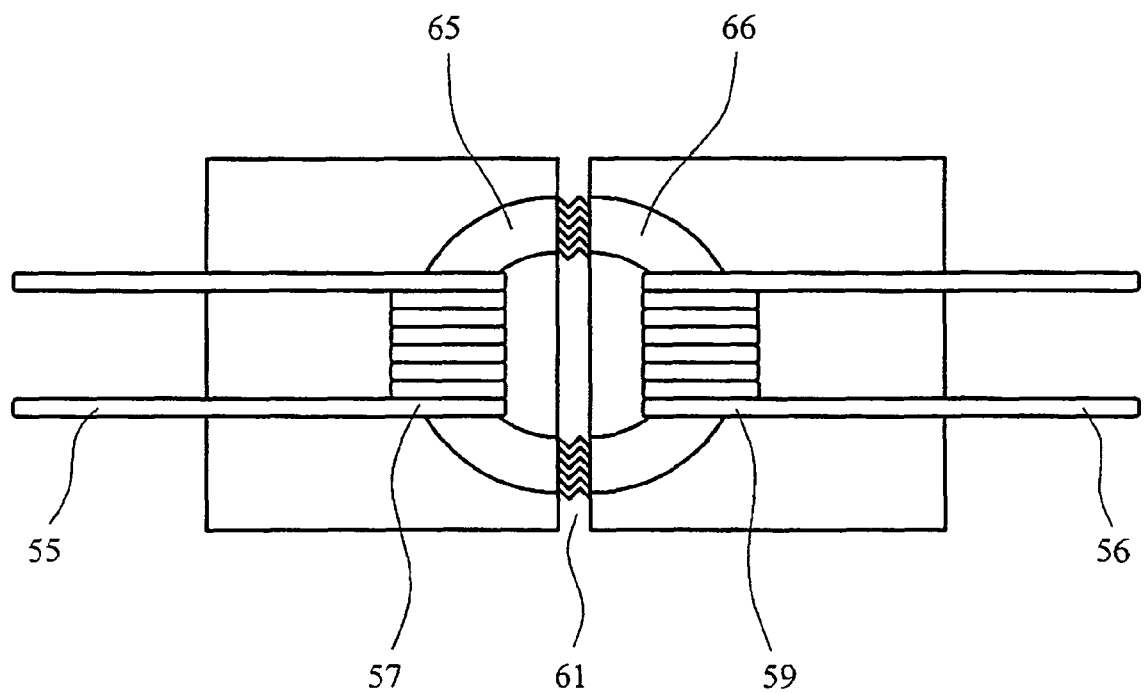
FIG. 6 is a schematic diagram of a first embodiment of the present invention.
Figure 7:
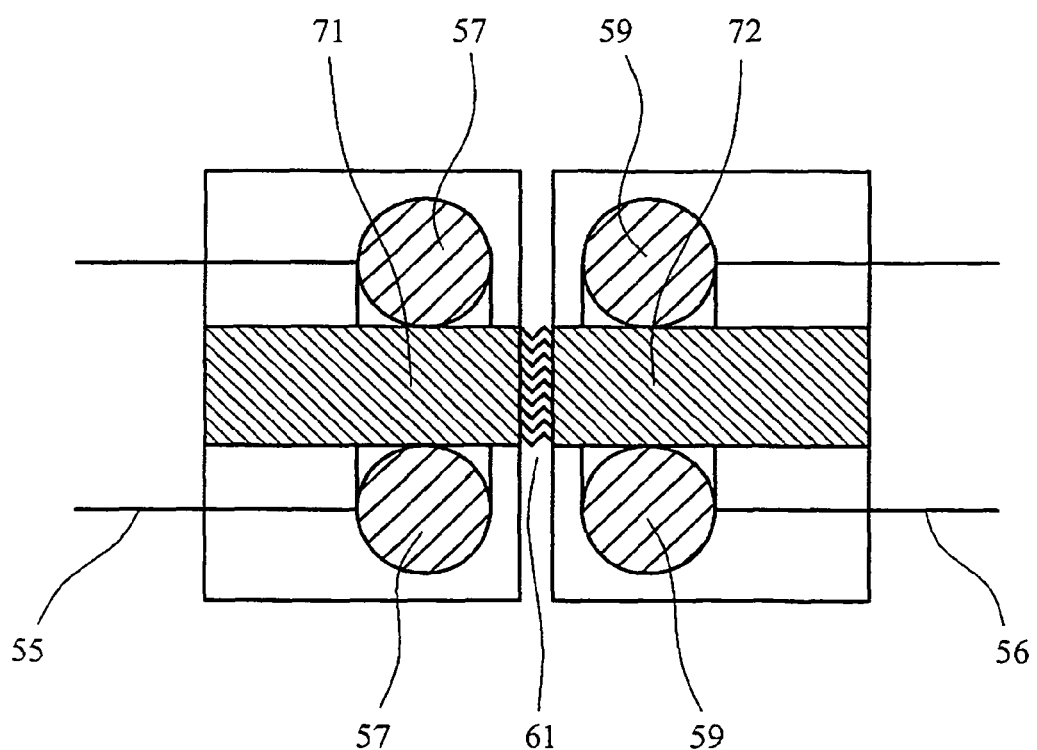
FIG. 7 is a schematic diagram of a second embodiment of the present invention.
Figure 8:
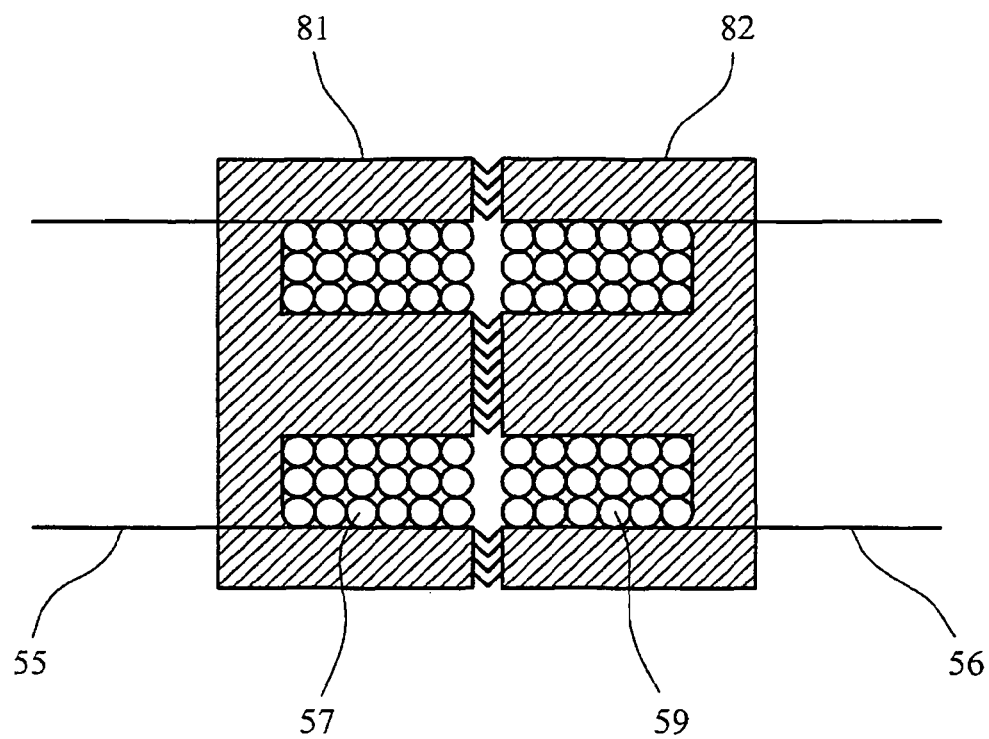
FIG. 8 is a schematic diagram of a third embodiment of the present invention.

The magnetic coupling can take a variety of forms, as illustrated in FIGS. 6, 7 and 8.

FIG. 6 shows a coupling for use in the invention, in which the core sections are formed from a split toroidal core, with a gap between core sections. The core sections 65, 66 may be formed from any ferromagnetic material, such as ferrite, soft iron, Mumetal, Permimphy or Supermimphy, and may be solid or laminated.

The two halves of the connector i.e. the first core section and the second core section, are housed in separate housings, to protect the coils and core sections. In operation, the housings may be screwed or otherwise mechanically fixed relative to each other to align the two core sections. However, the two housings should be easily separable for maintenance purposes.

FIG. 7 shows another coupling suitable for use in the present invention, in which the core is formed from a split bar, with a gap between core sections 71, 72. The connector of FIG. 7 is a schematic cross section, with the primary and secondary coils 57, 59 shown connected to first and second circuits 55, 56 respectively. Again, the core sections are housed in separate housings and may be formed from any ferromagnetic material, such as ferrite, soft iron, Mumetal, Permimphy or Supermimphy, and may be solid or laminated.

FIG. 8 shows a further coupling suitable for use in the present invention, shown in cross-section, with the core 81, 82 formed as a split pot core. The primary and secondary coils 57, 59 are shown connected to first and second circuits 55, 56 respectively. Again, the core sections 81, 82 are housed in separate housings and may be formed from any ferromagnetic material, such as ferrite, soft iron, Mumetal, Permimphy or Supermimphy.

Other core shapes are possible, such as "e" cores or "c" cores. The first and second core sections may be of the same size, shape and material properties as one another or may be different from one another.

Figure 9:
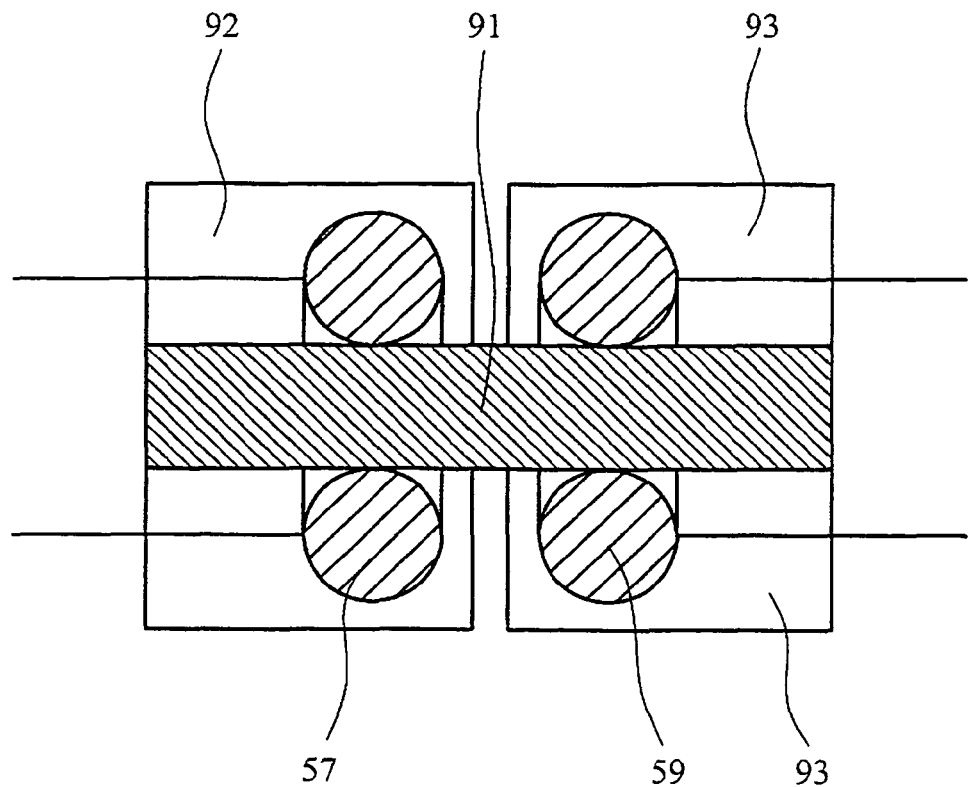
FIG. 9 is a schematic diagram of a fourth embodiment of the present invention.

An alternative arrangement in accordance with the invention is illustrated in FIG. 9. The connector may be formed with a single, open-ended core, such as a bar 91, over which the primary and secondary coils are wound. The primary coil 57 and the core 91 are housed in a first housing 92 and the other coil 59 housed in a second housing 93. The second housing 93 encompasses the coil but includes a bore through the center of the coil that slides over a portion the first housing to provide a magnetic coupling. Alternatively, the core 91 and the secondary coil 59 may be in one housing and the primary coil 57 in the other.

The invention claimed is:

1. A gas turbine electrical system comprising:
a signal source positioned within a gas turbine for producing an output signal;
an output terminal; and
a separable electrical connector connected between the signal source and the output terminal, wherein the connector comprises:
a primary coil electrically connected to the signal source and wound around a first magnetic core section, and
a secondary coil electrically connected to the output terminal but electrically isolated from the primary coil and wound around a second magnetic core section, wherein the primary coil is not wound around the second magnetic core section and the secondary coil is not wound around the primary core section, wherein the output signal is transmitted from the primary coil to the secondary coil and wherein the first and second magnetic core sections are physically separate from one another.

2. A gas turbine electrical system according to claim 1, wherein first and second magnetic core sections are spatially separated to define a gap between them, and wherein the output signal is transmitted across the gap.

3. A gas turbine electrical system according to claim 1, wherein the signal source is a sensor for sensing a parameter of the gas turbine in operation, and the output signal is indicative of the sensed parameter.

4. A gas turbine electrical system according to claim 1, wherein the first and second core sections have the shape of one of a split bar, a split toroid, a split pot core, two "C" shapes and two "E" shapes.

5. A gas turbine electrical system according to claim 1, wherein at least one of the first and second core sections is formed from at least one of ferrite, soft iron, Mumetal, Permimphy and Supermimphy.

6. A gas turbine electrical system according to claim 1, wherein at least one of the first and second core sections is laminated.

7. A gas turbine electrical system according to claim 1, wherein the primary coil and the secondary coil have a different number of turns to one another.

8. A gas turbine electrical system according to claim 1, wherein the primary coil and secondary coil are housed in separate housings.

9. A gas turbine electrical system comprising:
a signal source positioned within a gas turbine for producing an output signal;
an output terminal; and
a separable electrical connector connected between the signal source and the output terminal, wherein the connector comprises:
a primary coil electrically connected to the signal source; and
a secondary coil electrically connected to the output terminal but electrically isolated from the primary coil, wherein the primary and secondary coils are wound around a magnetic core, and wherein at least one of the primary coil and the secondary coil is removably mounted on the magnetic core.

* * * * *